United States Patent [19]

Gruen

[11] Patent Number: 4,698,198
[45] Date of Patent: Oct. 6, 1987

[54] UNIFIED FIRST WALL-BLANKET STRUCTURE FOR PLASMA DEVICE APPLICATIONS

[75] Inventor: Dieter M. Gruen, Downers Grove, Ill.

[73] Assignee: The United States of America as represented by the United States Department of Energy, Washington, D.C.

[21] Appl. No.: 828,078

[22] Filed: Feb. 4, 1986

Related U.S. Application Data

[63] Continuation of Ser. No. 485,529, Apr. 15, 1983, abandoned.

[51] Int. Cl.$^4$ ................................................. G21B 1/00
[52] U.S. Cl. ..................................... 376/146; 376/150; 376/306; 420/494; 420/489
[58] Field of Search ......................... 376/146, 150, 306; 420/494, 489; 148/436, 132

[56] References Cited

U.S. PATENT DOCUMENTS

| | | | |
|---|---|---|---|
| 2,969,308 | 1/1961 | Bell et al. ............................ | 376/146 |
| 3,762,992 | 10/1973 | Hedstrom ............................ | 376/150 |
| 3,808,432 | 4/1974 | Ashkin ................................. | 376/146 |
| 4,145,250 | 3/1979 | Ohkawa et al. ..................... | 376/150 |
| 4,279,697 | 7/1981 | Overhoff et al. ................... | 376/328 |
| 4,414,176 | 11/1983 | Krauss et al. . | |

FOREIGN PATENT DOCUMENTS 2508717 2/1975 Fed. Rep. of Germany ...... 376/306

OTHER PUBLICATIONS

Fusion Technology 1980, vol. 1, pp. 177–182, Rocco et al.
Fusion Technology 1980, vol. 1, pp. 225–232, Powell et al.
ANS Trans., 1977, pp. 68, 69.
J. of Nucl. Mat., 111 & 112, (1982), pp. 448–453, DeWald et al.
Proc. of 9th Symp. on Eng. Problems of Fusion Research, Chicago, Ill, 10/81, Krauss et al.

Primary Examiner—Harvey E. Behrend
Attorney, Agent, or Firm—Gustavo Siller, Jr.; William Lohff; Judson R. Hightower

[57] ABSTRACT

A plasma device for use in controlling nuclear reactions within the plasma including a first wall and blanket formed in a one-piece structure composed of a solid solution containing copper and lithium and melting above about 500° C.

5 Claims, 8 Drawing Figures

UNIFIED FIRST WALL-BLANKET STRUCTURE FOR PLASMA DEVICE APPLICATIONS

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

This is a continuation of application Ser. No. 485,529 filed Apr. 15, 1983, now abandoned.

BACKGROUND OF THE INVENTION

This invention relates to plasma devices for confining plasma at elevated temperatures and more particularly to plasma devices for generating power from neutron generating reactions. More specifically, the invention relates to structures which serve as both the first wall and blanket in the plasma device.

Plasma devices are frequently identified with fusion reactors used to confine plasma at elevated temperatures and to conduct experiments leading to nuclear fusion reactions. Considerable research and development work has been carried out in the past in the expectation that commercial units may be designed to generate power from neutron streams and other energy sources produced in the fusion reactions. Further background on these devices may be found in publications such as Fusion Reactor Physics, Principles and Technology by Terry Kanmash, Copyright 1975, by Ann Arbor Science Publishers, Inc.

In the designs for these devices, first wall structures are provided to form the first physical barrier for the plasma. The first wall is designed and constructed to withstand high particle and energy fluxes from the plasma, high thermal and mechanical stresses and elevated temperature operation. Also, the wall should not be a source of excessive plasma contamination. In addition to the first wall, blanket structures are included in the design to convert the fusion energy into sensible heat and provide for heat removal, to breed tritium and provide for tritium recovery and to provide some shielding for the magnet system. In the design and construction of the blanket, it is necessary that the blanket withstand high neutron fluences, elevated temperature operation, thermal and mechanical stresses, and be compatible with the chemical environment, the plasma and the vacuum. When necessary, a neutron multiplier is also present.

In some designs, as illustrated in FIG. 3, the first wall, neutron multiplier and blanket are separate parts constructed of different materials. In one design identified as STARFIRE, the blanket is constructed of a packed bed of particles (about 0.46 m thick) of $\alpha$-LiAlO$_2$ with stainless steel coolant tubes for head removal and passages through which helium may be fed for tritium removal. As indicated by the formula, $\alpha$-LiAlO$_2$ has a lithium atomic percentage of about 25%. Since $\alpha$-LiAlO$_2$ is essentially a ceramic material, its heat transfer properties are limited. In addition, as the concentration of lithium is reduced during the generation of tritium, it increases the probability of radiation damage and neutron leakage while decreasing the tritium production. Under these conditions, the useful life of the blanket becomes reduced and it may be necessary to replace the blanket on a more frequent schedule.

In addition to the problem with the life expectancy of the blanket, another problem relates to the limited heat transfer of the blanket. Other materials such as LiAl have been considered, however, they are not entirely satisfactory. To illustrate, LiAl is reactive with water. Therefore, new compositions for the blanket are desirable.

Accordingly, one object of the invention is a blanket for a plasma device which has a reduced rate of decrease in the lithium concentration. A second object of the invention is a process for replenishing lithium from which tritium may be generated. A third object of the invention is a composition for the blanket with an improved heat transfer. Another object of the invention is a composition for the blanket which is also useful for the first wall.

SUMMARY OF THE INVENTION

Briefly, the invention is directed to a first wall and blanket structure composed primarily of copper as an effective heat transfer medium with sufficient lithium to provide an effective source of tritium and resist radiation damage and neutron leakage at elevated temperatures. In the preferred embodiment, the first wall and blanket are incorporated into a one-piece structure with the lithium concentration being in the order of about 15-25 at. %. At the first wall, the lithium being of a relatively low atomic weight provides a surface with a low-z coating and an increased secondary ion/neutral ratio resulting in a greater return of sputtered atoms to the surface of origin. This is achieved at least in part by the phenomena that the surface concentration of lithium exceeds that in the bulk and is replenished by migration of lithium to the surface.

In the preferred embodiment, means are provided for replenishing lithium by using the helium as a carrier for lithium to the blanket as well as a carrier for tritium from the blanket. Tritium is recovered from the helium gas stream and the helium is recycled to the blanket with additional lithium. Only small amounts of lithium are required in the helium to serve as a source of lithium. Jacketed water passages are also provided in the structure to further control the temperature within the structure and remove useful heat with the jacket being of a composition such as stainless steel to limit the concentration of tritium in the water.

DETAILED DESCRIPTION OF THE PREFERRED EMBODIMENT

Figure 1:
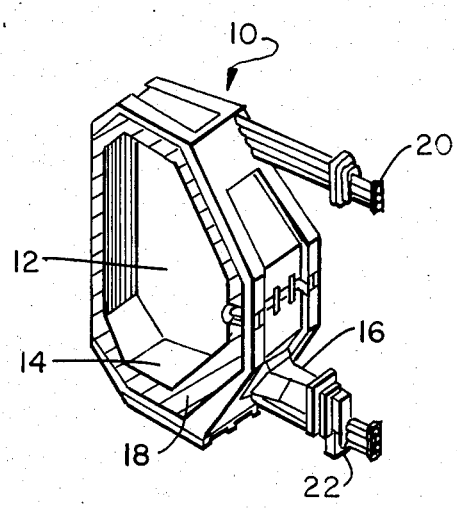
FIG. 1 is a perspective view of a previous design of the first wall and blanket portions of a plasma device.

In the development of the plasma device of the invention, the first wall and blanket are incorporated into a one-piece structure which is composed of a solid solution of copper and lithium. In copper-lithium solid solutions, a lithium content in the order of about 15-25 at. % may be achieved with the resulting crystalline structure being essentially patterned after that of copper. In addition to the useful heat transfer properties of the copper based compositions as illustrated by $Cu_3AlLi$ and $Cu_4Li$, they also are not readily degraded by contact with water as is LiAl. With the $Cu_3AlLi$ composition, the presence of the small amount of aluminum will also reduce the induced radioactivity level of the blanket particularly important when replacements or repairs become necessary. The use of the copper based compositions will also provide at least an equivalent useful life for the structure incorporating the first wall and/or blanket compared to the expected life of the previously suggested compositions.

Further, by adding a small amount of lithium to the helium gas stream being channeled through the blanket, sufficient lithium may be introduced to the structure to replace the lithium converted to tritium. An estimate of the amount of tritium generated is in the order of about 500 g/day based on a lithium content in the range of 15-25 at. % and a tritium production of 2 g of tritium per 100 gm of lithium in the composition.

Advantageously, the one-piece structure also includes means for channeling water through the blanket to remove sensible heat and control the temperature of the blanket to below about 600° C. and preferably below about 500° C. Jackets of a composition such as stainless steel are provided in the cooling ducts to limit the transfer of tritium to the cooling water.

In the drawings, FIGS. 1-5 are intended to illustrate previous designs of the first wall, blanket and associated equipment for a plasma device.

Figure 2:
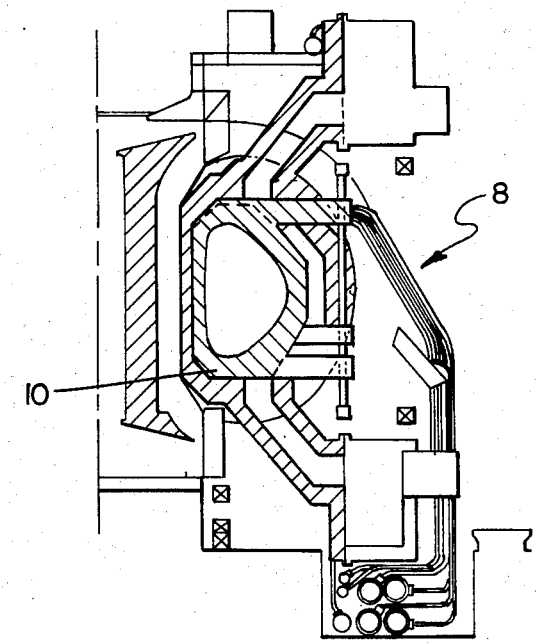
FIG. 2 is a cross section of a plasma device with the first wall and blanket of FIG. 1.

In FIG. 1 of the drawing, a conventional first wall and blanket are illustrated in a perspective view of a multi-piece structure 10. As illustrated, an inner zone 12 for plasma is confined within adjoining first wall 14 which is exposed to and provides a first barrier to the plasma. An RF duct 16 provides access to electrical circuits for generating the desired electrical and magnetic fields for confirming the plasma. Blanket 18 is outwardly adjacent first wall 14 and in general extends around the outer portion of the structure 10 with coolant manifolds 20 and 22 providing a means for channeling a coolant through the blanket 18. A cross section of a reactor 8 (in reduced size) is illustrated in FIG. 2 showing the general location of structure 10 within the reactor.

Figure 3:
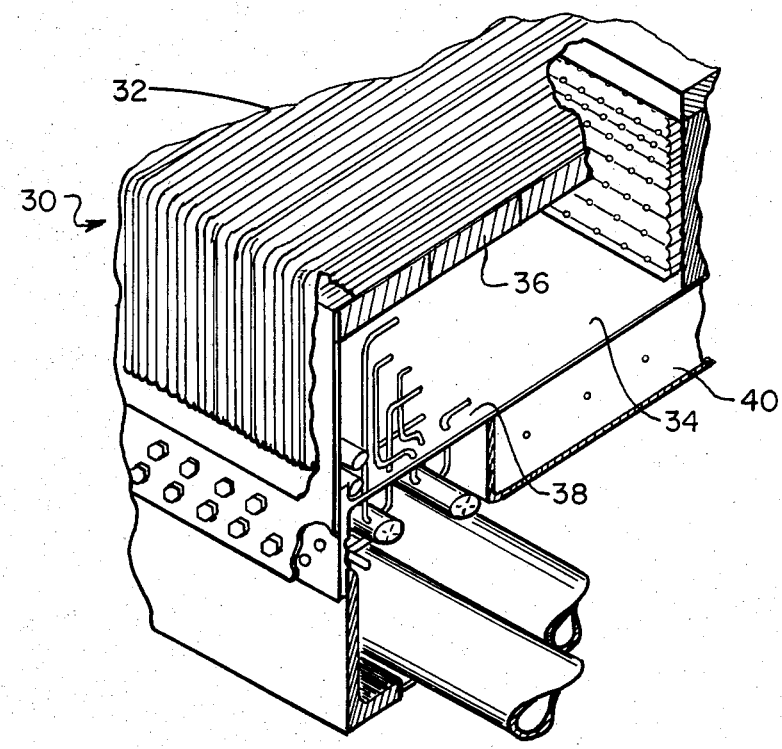
FIG. 3 is an enlarged view of the first wall and blanket structures of a type similar to that illustrated in FIG. 1 and FIG. 2.

FIG. 3 provides an enlarged sectional view of a multi-part structure 30 similar to but not necessarily identical to a portion of structure 10 of FIG. 1 showing first wall 32, blanket 34, neutron multipliers 36, breeder coolant tubes 38 and graphite reflector 40.

Figure 4:
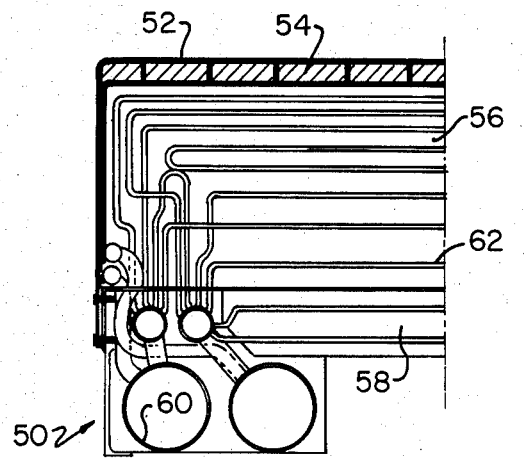
FIG. 4 is a representative cross sectional view of the first wall, neutron multiplier, blanket and cooling ducts of a plasma device of prior design.

FIG. 4 provides a general sectional view of representative structure 50 similar to structure 30 of FIG. 3 showing a first wall 52, neutron multiplier 54, blanket or breeder 56, reflector 58 and manifolds 60. Also illustrated are coolant tubes 62 extending through the blanket 56.

Figure 5:
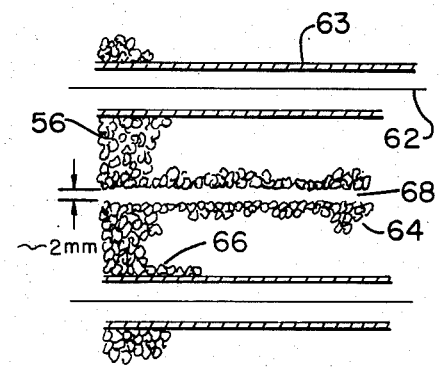
FIG. 5 is an enlarged view of a cross section of a portion of the blanket of FIG. 4.

In FIG. 5, an enlarged view of a section of the prior art structure from FIG. 4 is provided to illustrate the coolant tubes 62 with jackets 63, the blanket material 64 which is composed of $\alpha$-$LiAlO_2$ particles 66, and tritium purge channels 68 through which helium gas is pumped to remove tritium generated in the blanket 56.

Figure 6:
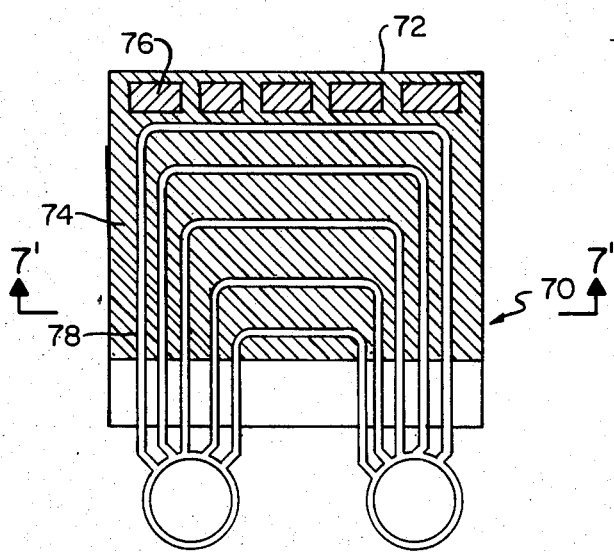
FIG. 6 is a cross sectional view of one embodiment of the invention.

In the embodiment of the invention illustrated in FIG. 6, the first wall 72 and blanket 74 are incorporated in a one-piece structure 70 with the neutron multiplier 76 being a separate portion retained in the structure. Coolant tubes 78 extend through blanket 74 to channel coolant within blanket 74 for removing sensible heat. Advantageously, the one piece structure 70 is composed of a copper-lithium solid solution containing a major amount of copper and a lithium content in the order of about 15-25 at. %. Preferably, the composition consists essentially of copper, lithium and aluminum in the respective atomic percentages of 55-85 at. %, 15-25 at. %, and 0-20 at. %.

Figure 7:
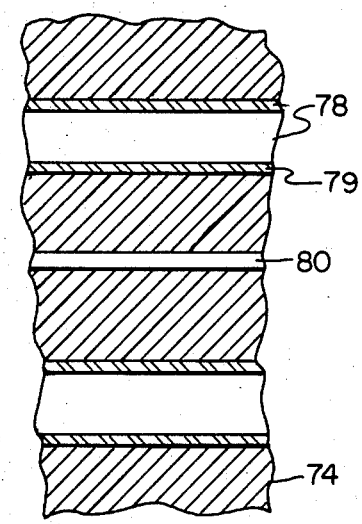
FIG. 7 is an enlarged view of a portion of the blanket of FIG. 6 taken along a small section of line 7—7'.

As illustrated in FIG. 7, the blanket includes purge channels 80 for feeding helium purge gas through blanket 74 and stainless steel jackets 79 for coolant tubes 78. Preferably the helium gas includes a small amount (in the order of about 0.01 to 0.05 at. %) of lithium within the gas to replenish the lithium in the blanket at temperatures in the order of about 500° C. where some lithium has been converted to tritium.

Figure 8:
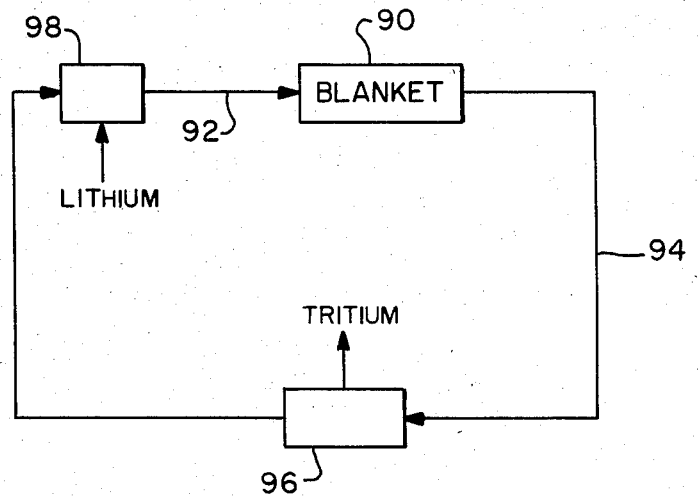
FIG. 8 is a schematic of a flow chart illustrating the replenishment of lithium for the blanket.

FIG. 8 provides a schematic view of the flow diagram illustrating the process in which make-up lithium is added to the helium gas before its being fed into blanket 90 via feed line 92. During passage of the helium gas through blanket 90, tritium is absorbed into the gas and is removed from blanket 90 via exit line 94. The tritium may be removed by absorbant 96 and the helium is recirculated to the lithium adding stage 98 and then to feed line 92. The resultant process provides a means for replenishing lithium converted to tritium in the reaction.

Accordingly, the invention provides a design for a plasma device in which the first wall and blanket are constructed in one-piece and composed primarily of copper with a minor amount of lithium. The presence of lithium provides a first wall surface and also a source of lithium.

The embodiments of the invention in which an exclusive property or privilege is claimed are defined as follows:

1. In a nuclear reaction plasma device for generating neutron streams having a plasma and a structure serving as both the first wall and the blanket, said structure comprising a first wall for containment of plasma at elevated temperatures, said first wall adjoining and exposed to an inner plasma zone thereby providing a first barrier to said plasma and a blanket containing multiple channels for channeling helium and multiple passages for channeling water through the blanket, said blanket being for generation of sensible heat from the neutron streams, said first wall comprising an inner surface for exposure to the plasma, the inner surface and the blanket being of a one-piece structure initially composed of a metallic solid solution containing a major amount of copper and about 15-25 at. % of lithium and melting above about 500° C., and wherein said blanket includes means for adding lithium vapor to the helium gas being channeled to the blanket for replacing lithium converted to tritium, the walls of said channels being composed of a material which will allow transfer of tritium from said blanket into said helium gas passing through said channels and transfer of said lithium vapor from said helium gas into said blanket.

2. The plasma device of claim 1 wherein said solid solution initially consists essentially of $Cu_3AlLi$.

3. The plasma device of claim 1 wherein said solid solution initially consists essentially of $Cu_4Li$.

4. The plasma device of claim 1 wherein said solid solution contains about 0–20 at. % of aluminum.

5. The plasma device of claim 1 including neutron multiplier structure confined as a separate structure within said single unitary structure.

* * * * *